March 15, 1960  J. H. LATZEN  2,928,687

SUPPORTING JOINT FOR FRONT WHEEL SUSPENSIONS ON MOTOR VEHICLES

Filed Sept. 20, 1956

INVENTOR.
Josef H. Latzen

BY

United States Patent Office 2,928,687
Patented Mar. 15, 1960

2,928,687

SUPPORTING JOINT FOR FRONT WHEEL SUSPENSIONS ON MOTOR VEHICLES

Josef H. Latzen, Schurkesfeld, Strump, Germany, assignor to A. Ehrenreich & Cie, Dusseldorf-Oberkassel, Germany Application September 20, 1956, Serial No. 611,083

Claims priority, application Germany September 22, 1955

2 Claims. (Cl. 287—90)

The present invention relates to supporting joints for front wheel suspensions on vehicles and, more particularly, to such supporitng joints with upwardly or downwardly extending ball pin.

Supporting joints are known for this purpose which have their ball head mounted in ball cups or sockets which in their turn rest against the inner wall of the housing of the joint or a joint cap. In particular, the joint cap formed by the steering tie rod or inserted thereinto requires a high precision of machining at its inner surface, and also the joint cap itself requires high precision of production in order to assure that the ball cup will completely and on all sides properly rest against the joint cap. This is all the more necessary in order to obtain a proper centering and a firm fitting of the ball socket in the joint cap and to prevent a chattering of the ball socket in the joint cap. Furthermore, with such joints an additional lubricating chamber is provided the manufacturing operation of which requires further expenses in material and labor.

It is, therefore, an object of the present invention to provide a supporting joint of the above mentioned type which will overcome the drawbacks set forth above.

It is another object of this invention to provide a supporting joint for front wheel suspensions of motor vehicles, which, while assuring a proper fitting of the ball socket in the joint cap, will considerably reduce the manufacturing costs inasmuch as it will not be necessary to meet the high precision requirements heretofore necessary.

These and other objects and advantages of the invention will appear more clearly from the following specification in connection with the accompanying darwings, in which.

General arrangement

The supporting joint according to the present invention is characterized primarily in that a cap-shaped intermediate chamber is formed between the ball socket receiving the supporting ball half and the socket shaped joint cap above said ball socket. In this way, it is possible to get along with a considerably reduced precision of production over heretofore necessary requirements for the socket shaped joint cap formed by the steering tie rod or inserted thereinto. The inner surface of the socket shaped joint cap as well as the outer surface of the ball socket may remain in their roughly machined condition or the tolerances during the operation may be selected as wide tolerances.

For purposes of centering the ball socket in the socket shaped joint cap, the cap-shaped intermediate chamber may taper toward the marginal portion so that its cross section defines a sickle-shaped space and the lateral circumferential portions of the ball socket will rest against the socket shaped joint cap. With this embodiment the production precision of the joint cap and the ball socket is merely limited to the diameter of their marginal portions.

The cap-shaped intermediate chamber or a portion thereof forms a lubricating chamber which may communicate with a lubricating device in the socket shaped joint cap. In this connection, the ball socket may be provided with radial bores by means of which the lubricant can pass from the cap-shaped intermediate chamber between the ball socket and the ball head.

Structural arrangement

Figure 1:
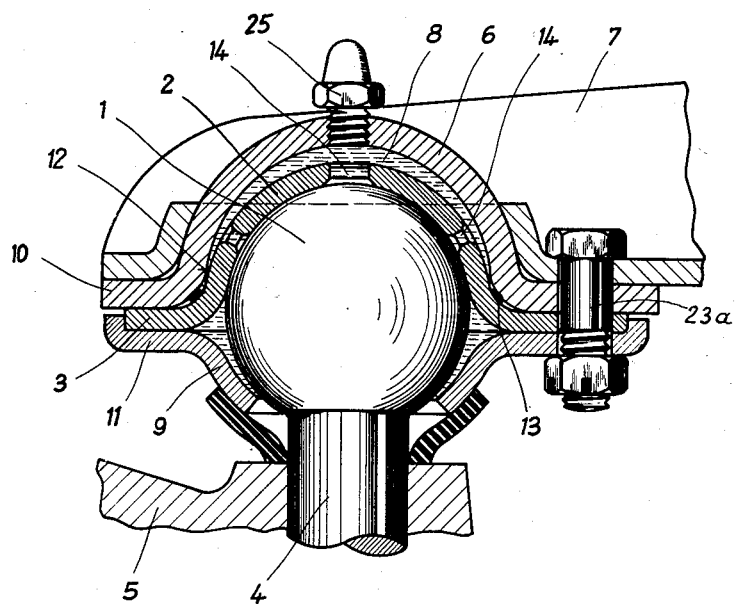
Fig. 1 is a section through a supporting joint according to the invention with the ball head arranged at the top of the ball stud.
Figure 2:
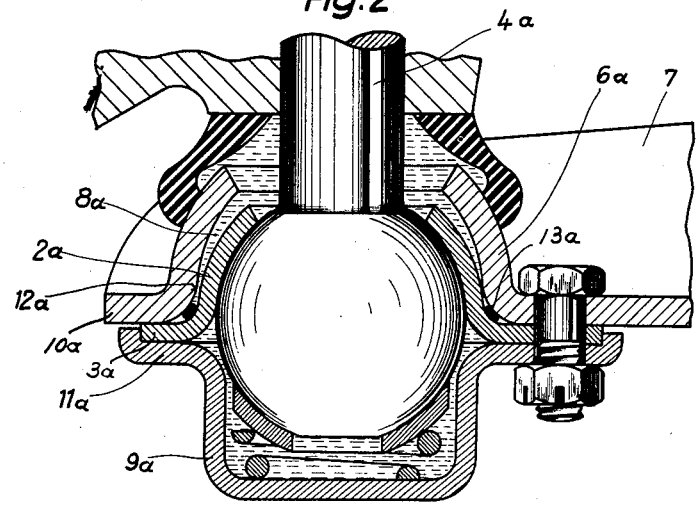
Fig. 2 is a section through a supporting joint according to the invention with the ball head arranged at the bottom of the ball stud.

Referring now to the drawings in detail and Fig. 1 thereof in particular, the arrangement shown therein comprises a ball head 1 the supporting portion of which rests in the ball cup or socket 2 which is provided with a flange 3. The ball stud 4 is in a manner known per se mounted in the steering knuckle support 5. The cap-shaped intermediate chamber 8 is provided between the ball socket 2 and the socket shaped joint cap 6 which, as shown in Fig. 1 may form a part inserted into the steering tie rod 7 or, as illustrated in Figs. 2 to 4 may be formed by the steering tie rod itself and may be integral therewith. The socket shaped joint cap 6 as well as the supporting cup or socket 9 encasing the joint, are provided with flanges 10 and 11 respectively which are interconnected by a screw connection 23a or by welding and hold the elements of the joint together. The elements 2, 6, and 9 may also previously be spot-welded and may then be interconnected by rolling the corresponding marginal portions accordingly.

According to the embodiments shown in Figs. 1 and 2, the cap-shaped intermediate chamber tapers toward the lower marginal portion thereof so that the ball socket 2, 2a and the socket shaped joint cap 6, 6a contact each other along a circle at 12, 12a only. A sealing ring 13, 13a may be inserted between the circular line of contact 12, 12a and the flanges 3, 3a, and 10, 10a, whereby the cap-shaped intermediate chamber 8, 8a will be additionally sealed. With this embodiment, a precision machining of the ball socket 2, 2a and socket shaped joint cap 6, 6a is necessary only with regard to the circular contact line 12, 12a for centering the ball socket in the joint cap, whereas the other portions of said ball socket 2, 2a and joint cap 6, 6a require a considerably less precision of production. In case the ball socket 2, 2a should break, the ball head will rest against the socket shaped cap 6, 6a without dangerously affecting the function of the joint.

The cap-shaped intermediate chamber 8, 8a forms a lubricating chamber which may communicate with a lubricating device 25 (shown in Fig. 1 only). The lubricant can from the thus formed lubricating chamber pass through bore 14 between the ball socket 2 and the ball head 1 (Fig. 1). The other parts of Fig. 2 corresponding to those of Fig. 1 have been designated with the same reference numeral as in Fig. 1 but with the affix a.

It is to be understood that the ball socket 2, 2a, may be provided with a contact surface of synthetic material, for instance of polyamide which may be applied to the ball socket by glueing, pressing or the like or is retained thereon by means of groove-like depressions, bores or the like. The ball socket 2 may also consist of a non-metallic synthetic material as for instance polyamide or of phenol resin.

It is, of course, to be understood that the present invention is, by no means, limited to the particular constructions shown in the drawings but also comprises any modifications within the scope of the appended claims.

What I claim is:

1. In a supporting joint for front wheel suspensions of motor vehicles including a stud with ball head: a housing comprising a first socket-shaped portion having its inner surface spaced from but surrounding a first surface portion of said ball head and having its marginal portion formed into a flange, said housing also comprising a second socket-shaped portion surrounding another portion of said ball head and provided with a flange facing said first mentioned flange, said second socket-shaped portion having a stud aperture therethrough through which said stud extends, and a socket having a portion interposed between one of said socket-shaped portions and said ball head and having its inner surface shaped in conformity with the surface of said ball head and in surface contact therewith, said socket having an annular planar flange clamped between the flanges of said socket-shaped portions, the outer surface of said socket radially inward of its flange contacting said one of said socket shaped portions along at least an annular line, said socket being spaced from said one of said socket-shaped portions between said flange of said portion and said line contact to provide a circumferential space, and being also spaced increasingly from said one socket-shaped portion with radially inward distance from said annular line contact to define a lubricant chamber therebetween, and means within said housing for supplying lubricant from said lubricant chamber to said ball head.

2. In a supporting joint for front wheel suspensions of motor vehicles including a stud with ball head: a housing comprising a first socket-shaped portion having its inner surface spaced from but surrounding a first surface portion of said ball head and having its marginal portion formed into a flange, said housing also comprising a second socket-shaped portion surrounding another portion of said ball head and provided with a flange facing said first mentioned flange, said second socket-shaped portion having a stud aperture therethrough through which said stud extends, a socket having a portion interposed between one of said socket-shaped portions and said ball head and having its inner surface shaped in conformity with the surface of said ball head and in surface contact therewith, said socket having an annular planar flange clamped between the flanges of said socket-shaped portions, an outer surface portion of said socket being spaced from the adjacent socket-shaped portion to define a lubricant chamber of crescent cross section and means within said housing for supplying lubricant from said lubricant chamber to said ball head, that outer surface of said socket radially inward of its flange contacting said last mentioned socket-shaped portion adjacent said flange substantially along a circular line, and an annular seal interposed between said line of contact of said socket with said last mentioned socket-shaped portion and the flange of said socket.

References Cited in the file of this patent

UNITED STATES PATENTS

| 1,876,704 | Lipcot | Sept. 13, 1932 |
| 1,909,010 | Riker | May 16, 1933 |
| 2,083,718 | Kull et al. | June 15, 1937 |
| 2,507,087 | Booth | May 9, 1950 |
| 2,645,510 | Booth | July 14, 1953 |
| 2,695,185 | Latzen | Nov. 23, 1954 |
| 2,752,178 | Hoffman | June 26, 1956 |